US012803251B2

(12) United States Patent
Costamagna

(10) Patent No.: US 12,803,251 B2
(45) Date of Patent: Nov. 17, 2026

(54) ELECTRICAL CABINET

(71) Applicant: E.T.A. S.P.A., Canzo (IT)

(72) Inventor: Andrea Costamagna, Como (IT)

(73) Assignee: E.T.A. S.P.A., Canzo (IT)

( * ) Notice: Subject to any disclaimer, the term of this patent is extended or adjusted under 35 U.S.C. 154(b) by 57 days.

(21) Appl. No.: 18/976,865

(22) Filed: Dec. 11, 2024

(65) Prior Publication Data

US 2025/0192525 A1 Jun. 12, 2025

(30) Foreign Application Priority Data

Dec. 12, 2023 (IT) ........................ 102023000026478

(51) Int. Cl.
*H02B 1/28* (2006.01)
*H02B 1/38* (2006.01)

(52) U.S. Cl.
CPC ................. *H02B 1/28* (2013.01); *H02B 1/38* (2013.01)

(58) Field of Classification Search
CPC .................................... H02B 1/28; H02B 1/38
See application file for complete search history.

(56) References Cited

U.S. PATENT DOCUMENTS

| | | | | |
|---|---|---|---|---|
| 2005/0047097 A1* | 3/2005 | Johnson | H02B 1/28 | 361/725 |
| 2015/0076978 A1* | 3/2015 | Ellingson | H02B 1/28 | 312/229 |
| 2017/0013737 A1* | 1/2017 | Kawabe | H02B 1/28 | |
| 2023/0112739 A1* | 4/2023 | Anderson | F16J 15/027 | 277/637 |
| 2024/0090665 A1* | 3/2024 | Boeltl | A47B 96/00 | |
| 2025/0192530 A1* | 6/2025 | Costamagna | H02G 3/081 | |
| 2026/0082500 A1* | 3/2026 | Thompson | H02B 1/28 | |

FOREIGN PATENT DOCUMENTS

| | | |
|---|---|---|
| DE | 29517327 U1 | 3/1997 |
| DE | 10102664 C1 | 3/2002 |
| EP | 3905461 A1 | 11/2021 |

OTHER PUBLICATIONS

Italian Search Report dated Jun. 6, 2024 from counterpart Italian App No. 202300026478.

* cited by examiner

*Primary Examiner* — Daniel J Rohrhoff
(74) *Attorney, Agent, or Firm* — SHUTTLEWORTH & INGERSOLL, PLC; Timothy J. Klima

(57) ABSTRACT

Electrical cabinet including a framework having an opening for access to a housing, a movable panel including a peripheral inner frame, coupling means reversibly fixed to the movable panel and configured to define a peripheral seat with the inner frame, a sealing gasket interposed between the movable panel and the framework, and at least one flared wall configured to define a preferential flow path.

12 Claims, 4 Drawing Sheets

ELECTRICAL CABINET

This application claims priority to Italian Patent Application No. 102023000026478 filed Dec. 12, 2023, which application is incorporated by reference herein.

The present invention relates to a cabinet for housing electrical components.

In particular, the present invention preferably falls within the food industry and/or medical field.

In other words, the cabinet which is the subject matter of the present invention specifically fits in environments and/or departments which are periodically controlled, and thus require frequent sanitisation.

Depending on the hygiene protocols of each environment, the location in which the electrical cabinet is found can be sanitised daily, weekly or monthly.

To date, the prior art describes metal cabinets comprising a containment compartment therein for electrical switching, distribution and branching components.

In order to limit the accumulation of dust or other contaminants, the cabinets used in this specific context are free, as much as possible, of cracks and recesses.

To this end, the assembly of the cabinet mainly involves welding together the various components constituting it. Thereby, constructive portions are eliminated which in their junction define cracks or joining spaces within which external agents can hide.

Disadvantageously, the cabinets are thus mainly made of pieces, viz., the main components are permanently assembled together, which makes it impossible to replace individual damaged or worn parts.

The cabinets also have at least one access door in the containment compartment, to allow any interventions on the electrical components.

In order to improve the waterproofing of the housing of the electrical components, in some cabinets, gaskets are provided which are interposed between the door and the containment framework defining the inner compartment.

Such gaskets are arranged to prevent water vapour and moisture in general from accumulating over time along the inlets of the cabinet, compromising the structure of the cabinet itself as well as the electrical components present in the compartment.

In some cases, because of the way the cabinet is made, replacing the gasket requires the replacement of the entire door.

In fact, the gasket is a structural component of the cabinet which requires particular maintenance, as it needs to be periodically replaced in order to prevent its damage and/or deterioration from compromising the functionality of the cabinet.

In fact, if not replaced in time, the gasket no longer provides insulation for the electrical components present in the cabinet housing.

The passage of moisture inside the cabinet housing would jeopardise the functioning of the electrical components, causing possible short circuits, and consequently endangering persons and objects present in the room to be sanitised.

Moreover, disadvantageously, the housing and side surfaces of the cabinet are places where dust and dirt accumulate, which can jeopardise the integrity of the essentially sterile environment in which they are located.

Another problem encountered in this type of cabinet is condensation, viz., the liquid residue which lingers on the horizontal surfaces of the bottom wall and top wall.

Disadvantageously, the stagnating liquid compromises the cabinet structure by chemically damaging the metal and deteriorating the cabinet surface.

Furthermore, disadvantageously, condensation invalidates proper sanitisation and hygienisation, increasing the formation of bacterial flora.

The technical task of the present invention is therefore to provide an electrical cabinet capable of overcoming the drawbacks resulting from the prior art.

The aim of the present invention is therefore to provide an electrical cabinet capable of preventing the retention of moisture and facilitating the flow of fluids.

A further aim of the present solution is therefore to provide an electrical cabinet which is capable of limiting the deposit of dust and/or other polluting residues.

A further aim of the present solution is therefore to provide an electrical cabinet which allows for easy and thus cost-effective maintenance.

Lastly, a further aim of the present is therefore to provide an electrical cabinet which is capable of efficiently isolating the electrical components housed therein from the water vapours sprayed during sanitisation of the environments.

The defined technical task and the specified aims are substantially achieved by an electrical cabinet comprising the technical characteristics set forth in one or more of the appended claims.

According to an aspect of the present invention, an electrical cabinet is provided.

The electrical cabinet comprises a framework defining a housing for electrical components.

The framework has an opening configured to allow access to the housing.

The framework of the electrical cabinet has at least one flared wall.

The flared wall is configured to define a preferential flow path.

The electrical cabinet comprises a movable panel.

The movable panel comprises a peripheral inner frame.

The movable panel comprises at least one hinge interposed between the movable panel and the frame.

The hinge defines a pivot axis of the movable panel.

The movable panel is rotatable between a closing and an opening configuration.

In the closing configuration, the inner frame is in contact with the framework.

In the closing configuration, the movable panel occludes the opening of the framework.

In the opening configuration, the inner frame of the movable panel is at least partially spaced from the frame.

The electrical cabinet comprises coupling means which are reversibly fixed to the movable panel.

The coupling means define a peripheral seat with the inner frame of the movable panel.

The electrical cabinet comprises a sealing gasket between the framework and the movable panel.

The sealing gasket is housed within the peripheral seat so as to waterproof the housing of the framework.

The waterproofing of the housing of the framework occurs when the movable panel is in the closing configuration.

Further characteristics and advantages of the present invention will become clearer from the indicative and therefore non-limiting description of an embodiment of an electrical cabinet.

Such a description will be set forth herein below with reference to the accompanying drawings, provided for merely indicative and therefore non-limiting purposes, in which.

Figure 1:
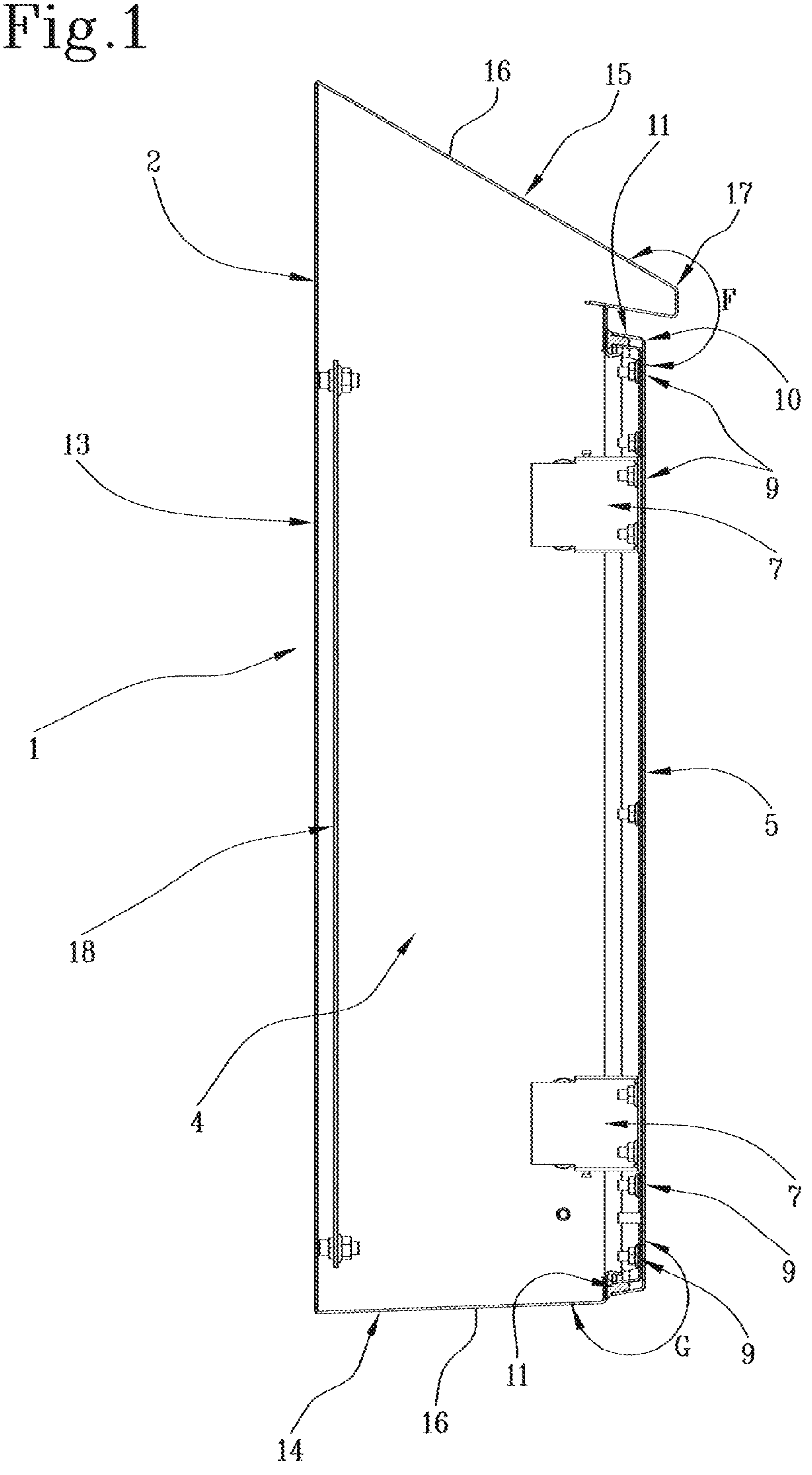
FIG. 1 shows a sectional side view of an electronic cabinet according to the present invention in a first possible configuration.

With reference to the attached figures, an electrical cabinet for housing electrical components has been indicated overall with 1, which, for simplicity of description, will be referred to below as electrical cabinet.

Electrical cabinet 1 is intended as power cabinets inside of which are stored, for example, circuit breakers and/or electrical panels.

The electrical cabinet 1 comprises a framework 2 defining a housing 4 used for receiving electrical components and having an opening 3 for access to the housing 4.

The framework 2, of the electrical cabinet 1, is preferably made mainly of stainless steel.

Figure 3:
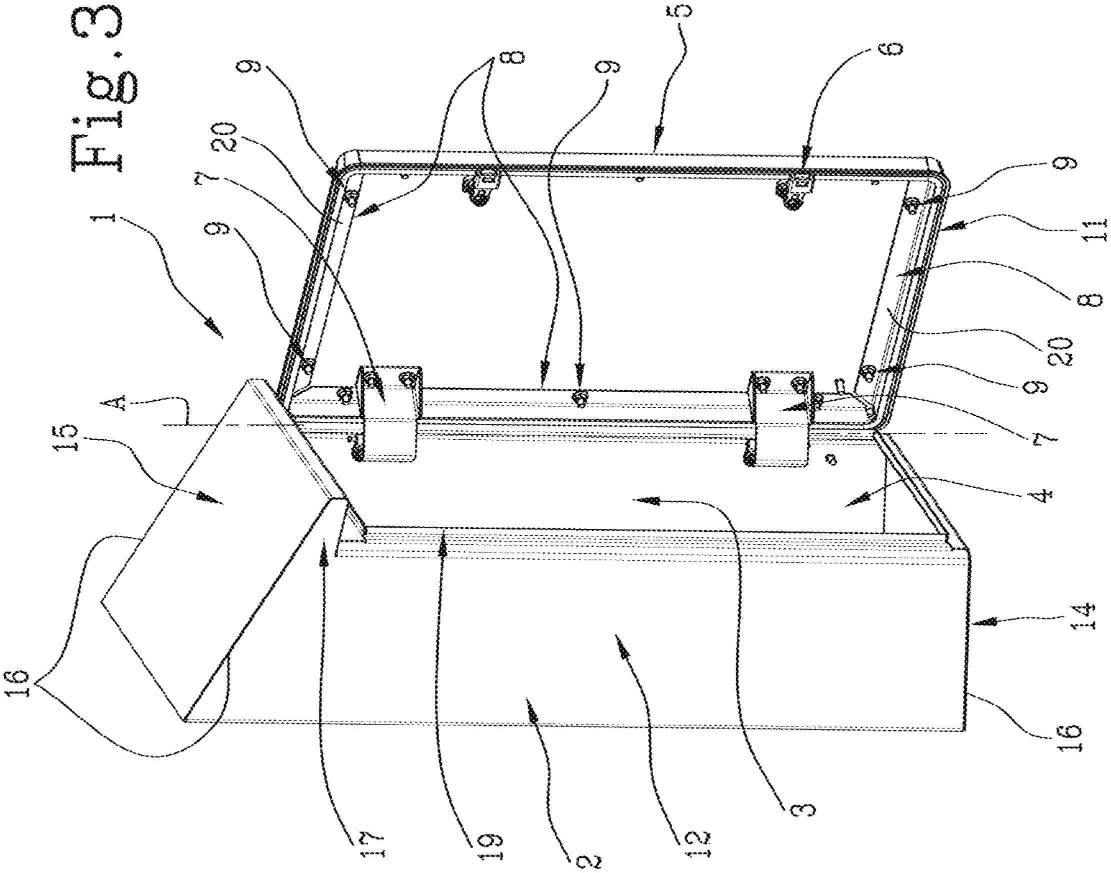
FIG. 3 shows a perspective view of an electrical cabinet according to the present invention in a second possible configuration.
Figure 2:
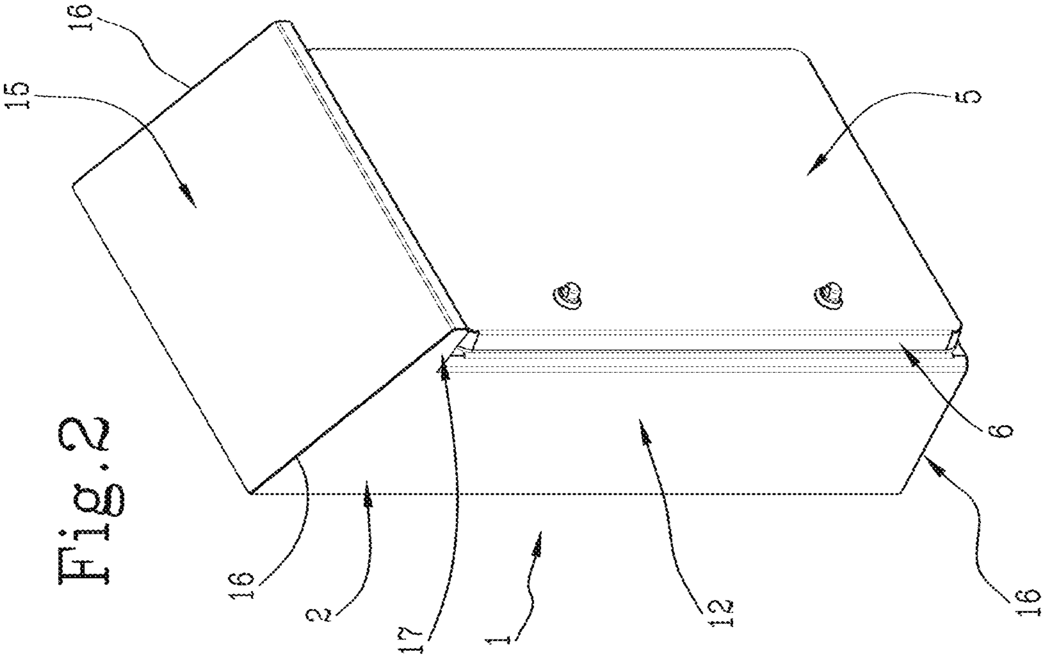
FIG. 2 shows a perspective view of FIG. 1.
Figure 5:
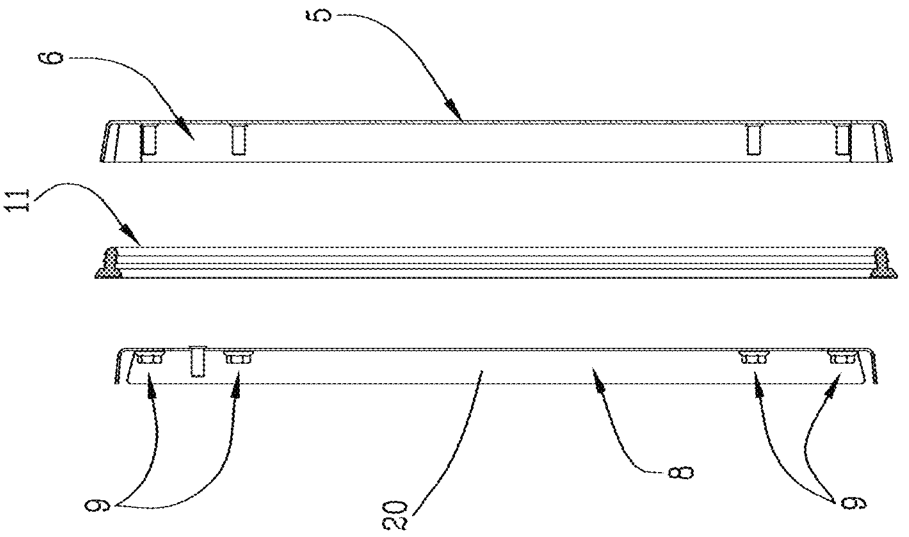
FIG. 5 shows a side view of FIG. 4.

Preferably, as shown in FIG. 1-3, the framework 2 has a substantially box-like shape.

The framework 2 has at least one flared wall 16 configured to define a preferential flow path.

Flared means that the wall is not horizontal, but has a given inclination.

Advantageously, the flared wall 16 promotes the flow of residual water vapour and limits the deposit of dust and dirt.

According to a possible embodiment of the present invention, the framework 2 comprises a first wall 14 defining a bottom wall and a second wall 15, opposite the first wall 14 and defining an upper cover.

The first wall 14 and/or the second wall 15 define, preferably, at least one flared wall 16. The second wall 15 of the upper cover may be made in the shape of a sloping roof 17 having a given angular orientation "F" with respect to the opening 3 of the framework 2, such that an angle less than 270° is defined outside the framework 2 between the second wall 15 and the opening 2.

Sloping roof 17 means a wall which protrudes from the framework 2 by a given angle, in this case in the direction of the opening 3, in order to facilitate the flow of liquids and to protect the housing 4 from condensation phenomena. As shown in FIG. 1, the first wall 14 can have a given angular inclination "G" with respect to the opening 3 of the framework 2, such that an angle less than 270° is defined outside between the first wall 1 and the opening 2.

Preferably, as shown in FIG. 1-3, the first wall 14 and/or the second wall 15 converge towards the opening 3 of the framework 2.

The framework 2 can further comprise an installation wall 13 opposite the opening 3.

In the case where the framework 2 has a box-like shape, the installation wall 13 is substantially parallel to the opening 3.

The installation wall 13, as shown in FIG. 1, comprises a plate 18 inside the housing 4 of the framework 2 configured to support electrical components.

According to a possible embodiment, the installation wall 13 comprises a system of spacers outside the housing 4 of the framework 2, configured to fix the electrical cabinet 1 to an external element.

External element means for example a wall of an environment to be sanitised.

The spacers preferably have a circular shape and are made of stainless steel.

In the case where the installation wall 13 comprises the spacers, the electrical cabinet 1 is preferably placed vertically and hung on an external element, e.g., a wall, with the opening 3 of the framework 2 opposite the external element.

Always for the purpose of supporting the electrical cabinet 1, the first wall 14 can comprise a plurality of adjustable support feet outside the housing 4 of the framework 2.

The feet have, according to a possible embodiment, threaded nuts to facilitate the coupling with the first wall 14.

In other words, depending on whether the electrical cabinet 1 is hanging suspended from the floor or rests on a surface such as a floor, the framework 2 will respectively comprise either spacers on the installation wall 13 or feet on the first wall 14.

The electrical cabinet 1 comprises a movable panel 5 comprising a peripheral inner frame 6 and at least one hinge 7.

The movable panel 5 is preferably mainly made of stainless steel.

The inner frame 6 protrudes inwards towards the housing 4 of the framework 2.

In other words, the inner frame 6 extends perpendicular with respect to said movable panel 5, in the direction of said opening 3 of the framework 2.

The hinge 7 is interposed between the movable panel 5 and the framework 2 defining a pivot axis (A) of the movable panel 5.

The movable panel 5 can be rotating between a closing configuration and an opening configuration.

In the closing configuration, the inner frame 6 is in contact with framework 2 to occlude the opening 3 of the framework 2.

In the opening configuration, the inner frame 6 of the movable panel 5 is at least partially spaced from the framework 2.

The electrical cabinet 1 further comprises coupling means 8 reversibly fixed to the movable panel 5.

The coupling means 8 are preferably mainly made of stainless steel.

The coupling means 8 define a peripheral seat 10 with the inner frame 6 of the movable panel 5.

According to a possible embodiment, the coupling means 8 are circumscribed within the inner frame 6 of the movable panel 5.

Preferably, the coupling means 8 comprise a plurality of brackets 20 defining the peripheral seat 10 with the inner frame 6 of the movable panel 5.

The plurality of brackets 20, always preferably, can comprise a first and second pair of parallel brackets.

The first pair and the second pair of brackets are perpendicular to each other.

Each bracket is therefore perpendicular to the contiguous bracket and parallel to the front bracket.

In other words, the four brackets 20, one on each side of the movable panel 5 define a second, non-continuous peripheral inner frame, as it is interrupted at the corners, viz., at the intersection of two brackets 20 perpendicular to each other.

The coupling means 8 can comprise at least one fixing element 9 configured to achieve the reversible fixing of the coupling means 8 to the movable panel 5.

Advantageously, the fixing elements 9 ensure a secure mounting of the coupling means 8 from the movable panel 5, and since the fixing is reversible, they facilitate the maintenance of the individual components.

The use of fixing elements 9 also allows to avoid the irreversible welding of the components and thus, in the event of wear or damage, to allow the replacement of individual components, saving money on those parts which are still functional, which can be disassembled with respect to the compromised piece and reused.

Preferably, at least one fixing element 9 is made in the form of a flat-head bolt.

Advantageously, the flat head of the bolt limits the accumulation of dust and dirt, which would otherwise deposit in the notches present in normal bolt heads.

Figure 4:
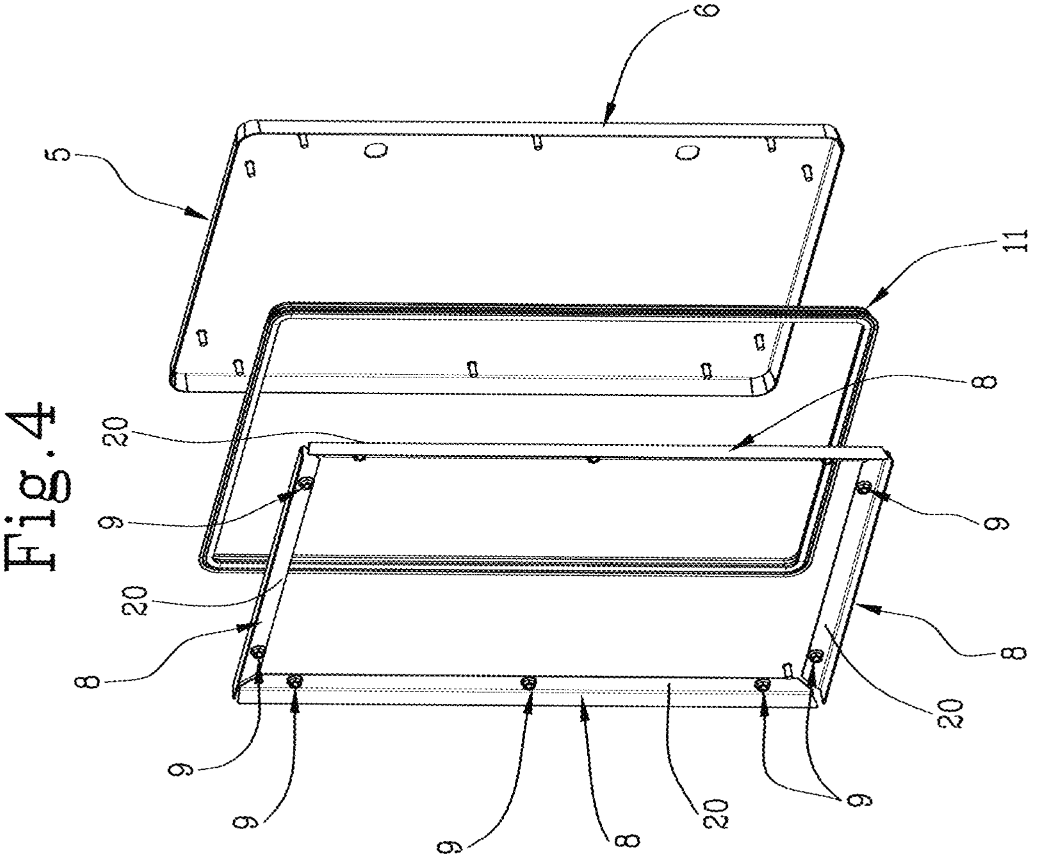
FIG. 4 shows an exploded perspective view of a detail of an electronic cabinet according to the present invention.

Preferably, as shown in FIGS. 3 and 4, there are two flat-head bolts for each bracket 20, for a total of eight bolts.

In this case, the are placed near the ends of the brackets 20.

The electrical cabinet 1 comprises a sealing gasket 11, interposed between the movable panel 5 and the framework 2, housed within the peripheral seat 10.

The sealing gasket 11 is thus inserted in the peripheral seat by means of pressure.

In other words, the sealing gasket 11 is configured to fit and expand between the coupling means 8 and the inner frame 6 of the movable panel 5.

Advantageously, the sealing gasket 11, being interposed between the coupling means 8 reversibly fixed to the inner frame 6 of the movable panel 5, is easily detachable from the rest of the aforementioned components and thus replaceable in case of wear.

The sealing gasket 11 allows to waterproof the housing 4 of the framework 2 when the movable panel 5 is in the closing configuration.

Advantageously, the sealing gasket 11 insulates the housing 4 from water vapours sprayed during the sanitisation of the environments in which the electrical cabinet 1 is located.

According to a possible embodiment, the framework 2 comprises at its opening 3 a peripheral lip 19 configured to abut with the sealing gasket 11 when the movable panel 5 is in the closing configuration.

The peripheral lip 19 acts as an inner counter-frame, filling the gaps created between the movable panel 5 and the framework 2.

Advantageously, the peripheral lip 19 limits the passage of moisture inside the housing 4 of the framework 2 and prevents the deposit of dust and/or dirt in the areas surrounding the opening 3 of the framework 2.

Figure 6:
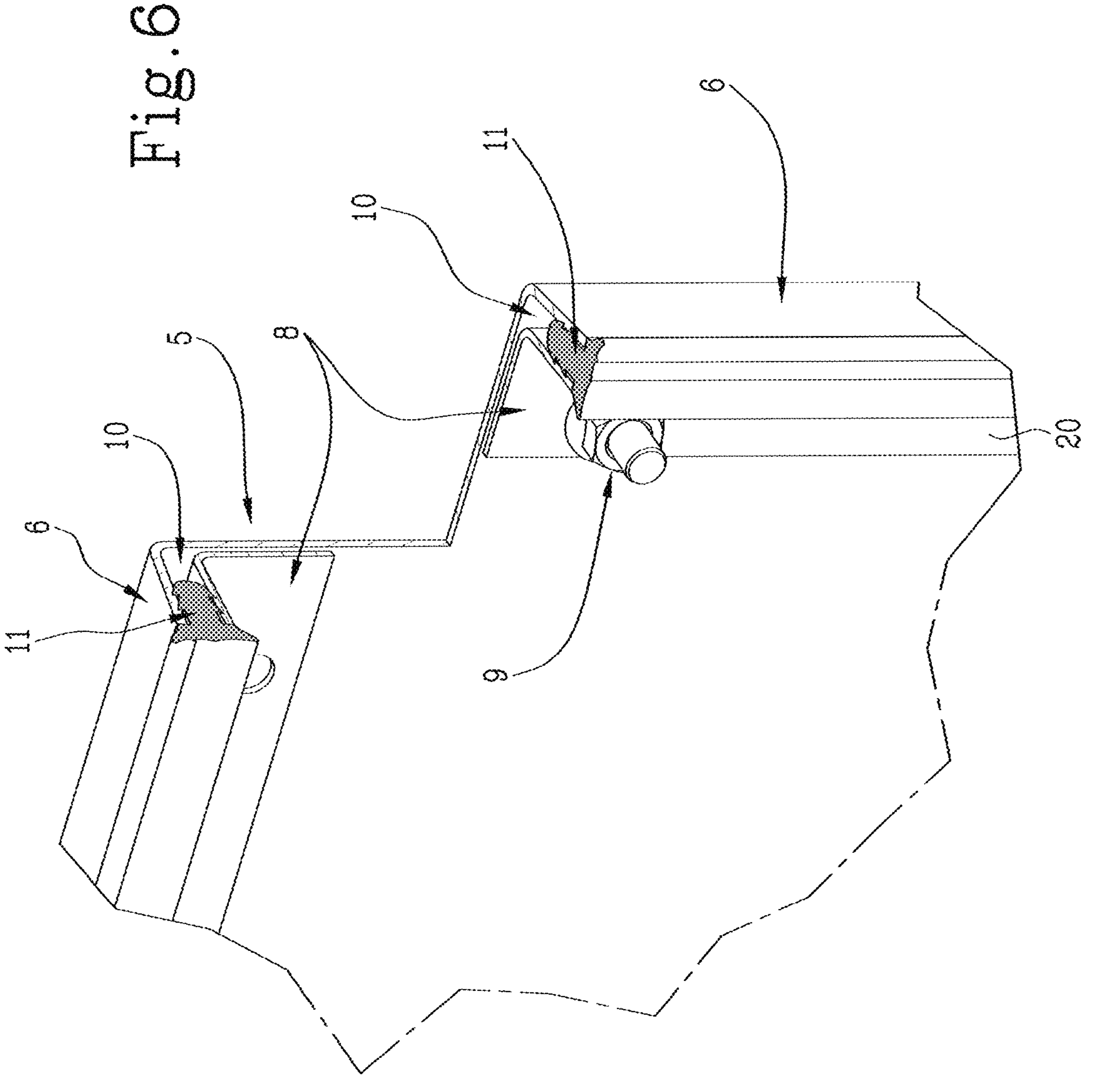
FIG. 6 shows a zoom of a detail of an electronic cabinet according to the present invention.

Preferably, as shown in FIG. 6, the gasket has a portion insertable within the peripheral seat 10 having a dowel profile provided with one or more fins suitable for providing a reversible mating of the gasket with the peripheral seat 10.

The sealing gasket 11 can be made of elastomeric material in order to facilitate its insertion in the peripheral seat 10.

Preferably, the sealing gasket 11 is mainly made predominantly of polymer material.

Even more preferably, the sealing gasket 11 is made of silicone material.

Advantageously, the present invention provides an electrical cabinet 1 capable of overcoming the drawbacks which have emerged of the prior art.

Advantageously, the present invention allows to avoid the retention of moisture, and facilitates the flow of fluids within the housing 4.

Advantageously, the present invention limits the deposition of dust and/or other polluting residues within the housing 4.

Advantageously, the present invention provides an electrical cabinet 1 whose maintenance is facilitated and thus time and cost-saving.

Advantageously, the present invention allows to efficiently insulate the electrical components housed within the electrical cabinet 1 from water vapours sprayed during the sanitisation of environments or from other unwanted external agents within the housing 4.

The invention claimed is:

1. An electrical cabinet comprising:

a fixed framework defining a housing for receiving electrical components and having an opening for access to said housing;

a movable panel comprising a peripheral inner frame;

a sealing gasket interposed between the movable panel and the framework;

at least one hinge interposed between said movable panel and said framework to movably attach said movable panel to said fixed framework and defining a pivot axis of said movable panel with respect to said framework;

said movable panel being rotatable between a closing configuration in which said inner frame is in contact with said framework to occlude said opening of said framework, and an opening configuration in which said inner frame of said movable panel is at least partly spaced from said framework;

a coupling device reversibly fixed to said movable panel to define a peripheral seat with said inner frame of the movable panel;

said sealing gasket being housed within the peripheral seat to move with the movable panel and to waterproof said housing of the framework when said movable panel is in said closing configuration;

said framework having at least one sloping wall configured to define a preferential flow path; and wherein said framework comprises at said opening a peripheral lip configured to abut with said sealing gasket when said movable panel is in said closing configuration to provide a seal between the framework and the movable panel.

2. The electrical cabinet according to claim 1, wherein said framework comprises a first wall defining a bottom wall and a second wall, opposite said first wall and defining an upper cover, said first wall and/or said second wall defining said at least one sloping wall.

3. The electrical cabinet according to claim 2, wherein said second wall of said upper cover is configured as a sloping roof having a given angular orientation with respect to said opening of said framework, such that an angle less than 270° is defined outside said framework between said second wall and said opening.

4. The electrical cabinet according to claim 2, wherein said first wall has a given angular inclination with respect to said opening of said framework, such that an angle less than 270° is defined outside said framework between said first wall and said opening.

5. The electrical cabinet according to claim 2, wherein said first wall and/or said second wall converge towards said opening of the framework.

6. The electrical cabinet according to claim 1, wherein said coupling device is circumscribed within said inner frame of the movable panel.

7. The electrical cabinet according to claim 1, wherein said coupling device comprises a plurality of brackets defining said peripheral seat with said inner frame of the movable panel.

8. The electrical cabinet according to claim 7, wherein said plurality of brackets comprises a first and a second pair of parallel brackets; said first pair and said second pair of brackets being perpendicular to each other.

9. The electrical cabinet according to claim 1, wherein said coupling device comprises at least one fixing element configured to achieve said reversible fixing of the coupling device to said movable panel.

10. The electrical cabinet according to claim 9, wherein said at least one fixing element is formed as a flat-head bolt.

11. The electrical cabinet according to claim 1, wherein said sealing gasket has a portion insertable within said peripheral seat and having a dowel profile provided with one or more fins suitable for providing a reversible mating of said sealing gasket with said peripheral seat.

12. The electrical cabinet according to claim 1, wherein said sealing gasket is made of elastomeric material.

* * * * *